Jan. 10, 1950   F. J. CARLIN   2,494,329
FORM
Filed Jan. 15, 1948
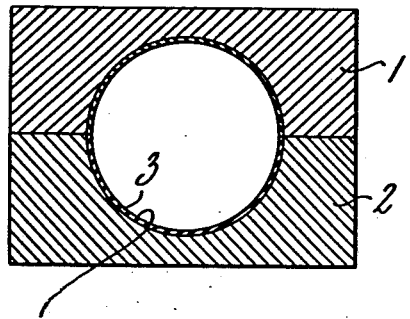
COATING OF BAKED MIXTURE
OF AN INTERPOLYMER OF A
STYRENE AND A DIALLYLIC
FUMARATE AND A MINOR
PROPORTION OF A POLYMERIC
ALKYL ARYL SILICONE RESIN
INVENTOR.
FRANK J. CARLIN
BY
Robert J. Patterson
ATTORNEY Patented Jan. 10, 1950

2,494,329

UNITED STATES PATENT OFFICE 2,494,329

FORM

Frank J. Carlin, Allendale, N. J., assignor to United States Rubber Company, New York, N. Y., a corporation of New Jersey Application January 15, 1948, Serial No. 2,542

12 Claims. (Cl. 18—47)

This invention relates to rubber vulcanization and more particularly to vulcanization of rubber using a metallic form, the rubber-shaping surface of which is so treated that adhesion thereto of the rubber article being vulcanized is prevented and at the same time a high polish is imparted to the vulcanized article so that the necessity for painting the same in order to give it an attractive finish is eliminated. My invention may be applied to the metallic surface of any rubber-forming or rubber-supporting devices which are used to shape or support rubber articles during vulcanization and which are typified by molds which are negatives of the article being formed and latex dipping forms which are positives of the article being formed and which serve as forms upon which the latex deposits during the dipping and to support the dipped articles during the subsequent vulcanization operation. My invention resides in the rubber-forming or rubber-supporting device, the method of vulcanizing rubber in contact therewith, and the composition of matter used for treating the rubber-contacting surface. The term "form" is used herein in a generic sense to denote any device for imparting a desired shape to, or for supporting, a rubber article undergoing vulcanization.

In the vulcanization of rubber in contact with metallic forms, the adhesion of the rubber stock to the metallic surface of the form has been a very serious problem in the art. Numerous attempts have been made to overcome this difficulty, these attempts mainly involving the use of lubricants, such as talc, soap, etc., which are interposed between the rubber and the metallic forming surface, for example by dusting the surface therewith. However, the use of lubricants has been unsatisfactory for many reasons. One objection to their use is that they are temporary in their action, it being necessary to lubricate the form each time that it is employed. Furthermore, it is difficult to apply exactly the right amount of the lubricant and this results in an undue number of rejects. For example, if an insufficient amount of the lubricant is used, excessive sticking is encountered. If too much of the lubricant is employed, rejects are frequent because of poor consolidation of the rubber at seams and joints. Many other objections to the use of lubricants will be apparent to those skilled in the art.

The accompanying drawing portrays diagrammatically a mold prepared in accordance with my invention.

I have discovered that rubber articles may be vulcanized in contact with metallic forms in a superior manner and without the disadvantages referred to above by coating the rubber-contacting surfaces of the forms with a mixture of a soluble, fusible resinous interpolymer of a styrene with a diallylic fumarate, and a minor proportion of a polymeric alkyl aryl silicone resin and baking the coating to convert it to the insoluble, infusible state.

Any method of applying the resinous mixture to the metallic surface of the form so as to give a uniform film after the baking step may be employed. Generally I prefer to apply the resinous interpolymer of the styrene and the diallylic fumarate and the polymeric alkyl aryl silicone resin in the form of a solution in a volatile organic solvent. The bulk of the organic solvent may be allowed to evaporate from the coated surface whereupon the resulting coating may be baked to give the final coated form. While any solvent or mixture of solvents capable of dissolving the two resinous components of my mixture may be used, I find it convenient to use aromatic solvents such as xylene, toluene, benzene, etc. The coating composition may be made of any desired consistency and may be applied to the form by any suitable method such as spraying or brushing.

A superior and unexpected result is obtained by the addition of the minor proportion of the alkyl aryl silicone resin to the soluble interpolymer of a styrene and a diallylic fumarate. The release qualities of the coated forming surface and the appearance of the surface of the rubber produced by using this combination are as good as those produced with the straight alkyl aryl silicone resin. Not only is the combination much less expensive than a coating of the straight alkyl aryl silicone resin but accelerated tests show that the service life of the combination film is much greater than that of the straight silicone film.

The proportion of the alkyl aryl silicone resin employed in conjunction with the soluble resinous interpolymer of a styrene and a diallylic fumarate may vary over wide limits. However, I have found that the use of from 0.2% to 1% of the alkyl aryl silicone resin, based on the weight of the soluble resinous interpolymer, is sufficient to produce the desired form release qualities. Larger amounts of the alkyl aryl silicone resin may be used but effect no advantage and so are not ordinarily used.

The resin employed as the major component of the coating of the present invention is a soluble (by which is meant acetone-soluble), fusible interpolymer of a styrene and a diallylic fumarate prepared by any known means. In order to limit the interpolymerization of the styrene and diallylic fumarate to the soluble, fusible stage, a solubilizing agent is employed during the preparation of the interpolymer. The solubilizing ingredient used may be an inert diluent, e. g., xylene, although it is preferred to employ a monoenic third unsaturated comonomer, e. g., allyl alcohol or diisobutylene, as solubilizing ingredient, since the extent of conversion of the styrene and the diallylic fumarate to soluble, fusible interpolymer is thereby greatly increased. In any case the resulting resin contains allylic ester unsaturation and, upon application of heat to the resin, as in the baking of the coating, the resin undergoes further polymerization to the insoluble, infusible stage. The styrene used in making the interpolymer has the formula

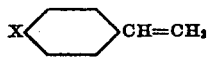

where X is either hydrogen, methyl or chlorine. The diallylic fumarate has the formula

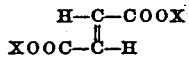

where X is either allyl or methallyl, generally the former. The unsaturated compound employed as the third comonomer, if such is used, may be either an allylic alcohol having the formula

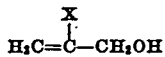

where X is either hydrogen or methyl, or an acyclic or alicyclic monoolefinic hydrocarbon, preferably such a hydrocarbon having at least 6 carbon atoms per molecule, for example, hexene, heptene, octene, nonene, decene, dodecene, cyclohexene, methyl cyclohexene, etc. Preferred comonomers are allyl alcohol, and diisobutylene (by which is meant either 2,4,4-trimethylpentene-1 or 2,4,4-trimethylpentene-2 and particularly a mixture of both with the former predominating such as is obtained by the catalytic dimerization of isobutylene). The relative proportions of the styrene, the diallylic fumarate and the third comonomer charged to the interpolymerization step by which the resin is made may vary widely. For example, the molar ratio of the diallylic fumarate to the styrene may vary from 1:1 to 1:6 and preferably is within the range of from 1:1 to 1:5; and the amount of the third comonomer, when it is used, may range from as low as 10% by weight, based on the weight of the fumarate, up to as high as 700%, but preferably ranges between 300 and 500% by weight of the fumarate. The interpolymerization may be conducted by subjecting a charge consisting of the two or three monomeric materials mentioned, with or without an additional solvent or diluent such as xylene which may be added as an azeotrope with the allyl alcohol (where allyl alcohol is used as the third monoenic comonomer), and a conventional organic peroxide catalyst to temperatures ranging from 25° C. to 120° C. The interpolymerization may be halted when it has proceeded to the desired extent, not beyond the acetone-soluble stage, and the resulting soluble interpolymer is then recovered in any suitable manner as by distilling out any unreacted starting materials and further purifying, if desired, by dissolving the interpolymer in a solvent such as acetone and precipitating it therefrom with a non-solvent such as gasoline. Where allyl alcohol is used as the third comonomer it may be desirable to heat-treat the resulting interpolymer, say at temperatures ranging from 70° C. to 125° C., to remove therefrom small amounts of allyl alcohol which might otherwise be liberated subsequently and produce undesirable lachrymatory effects.

The polymeric alkyl aryl silicone resins employed in the practice of my invention are materials well known in the art. They may be prepared in accordance with known methods such as are described in "An Introduction to the Chemistry of the Silicones" by E. G. Rochow (Wiley, 1946), pages 80–82. A convenient method of preparation involves the hydrolysis of an alkyl aryl-dichlorosilane followed by dehydration and condensation by heating the hydrolysis products to a suitable elevated temperature. The polymers produced are believed to have the unit structure

where R is an alkyl radical, usually a lower (not higher than propyl) alkyl radical and generally methyl and Ar is any aryl radical, halogenated or unhalogenated such as phenyl, mono- and poly-alkylphenyl such as tolyl, xylyl, mono-, di- and tri-ethylphenyl, mono-, di- and tri-propylphenyl, etc., naphthyl, alkylated naphthyl, tetrahydronaphthyl, and chloro, fluoro, bromo and iodo nuclearly-substituted derivatives of such aryl radicals. The condensation is stopped while the polymer is still in the fusible, soluble stage. The resulting resin may be termed a polymeric-alkylarylsiloxane. A preferred material for use in my invention is polymeric methyl phenyl silicone resin, also known as polymethylphenylsiloxane, which is readily available commercially.

The silicone resin used in accordance with my invention may be described as a thermosetting silicone resin characterized by solubility in aromatic hydrocarbons and by capability of being baked to form a hard, tough, insoluble, infusible film. The commercially available resins of this character are alkyl aryl silicones in which the molar proportions of alkyl and aryl groups are almost equal, say from 0.9 to 1.3 alkyl groups per aryl group, and the ratio of total hydrocarbon groups to silicon is about 1.8, i. e., from 1.7 to 1.9. Resins in which the proportion of alkyl is higher than that of aryl, say from 1.1 to 1.3 alkyl groups per aryl group, are preferred, in order to avoid brittleness. An example of a suitable resin is one having an average of 1.00 methyl group and 0.80 phenyl group per silicon atom (U. S. Patent 2,258,222).

Suitable hydrocarbon solvents for the thermosetting silicone resins are petroleum aromatics and coal tar naphthas. Toluene and xylene are particularly preferred.

The present invention is based on my discovery that such polyalkylarylsiloxanes are completely compatible with the interpolymers described herein. This is in contrast with the polyalkylpolysiloxanes which are incompatible and cannot be used in the practice of my invention.

The soluble interpolymer of styrene and diallylic fumarate is converted to the insoluble, infusible stage during the baking of the coated form.

The coating composition is generally formulated with a relatively large amount of a volatile solvent such as xylene, toluene or benzene in order to reduce it to a suitable consistency for application to the form by ordinary methods. However, the proportion of the solvent employed should not be so large that the resulting film obtained after the baking step is objectionably thin. I have found it advantageous to employ the solvent in an amount approximately equal to the weight of the resins, namely the interpolymer and the polymeric alkyl aryl silicone. For example, the relative proportion of the solvent and the resins preferably ranges from 40 to 75% by weight of solvent and correspondingly from 60 to 25% by weight of the resins.

I have found it preferable to disperse a substantial proportion of a pigment such as raw sienna, antimony oxide, lithopone, etc., in the coating composition. A suitable proportion of such pigment may be from 60 to 100 parts by weight of pigment per 100 parts by weight of the soluble, resinous interpolymer employed in the formulation.

It is desirable to include in the formulation a small amount of a manganese salt. Such salts appreciably reduce the time and temperature necessary to cure the coating to an insoluble, infusible state by catalytically accelerating the conversion of the soluble interpolymer to the insoluble, infusible state. Any of the known manganese salts which are soluble in the interpolymer solution may be employed such as manganese chloride, manganese acetate, manganese naphthenate, manganese resinate, etc. The amount may be such as to give from 0.001% to 5% by weight of manganese based on the weight of the interpolymer in the formulation. I have found it convenient to employ manganese naphthenate in an amount such that the proportion of manganese is 0.25% by weight based on the weight of the interpolymer.

The resulting solution of the interpolymer and the polymeric alkyl aryl silicone, preferably containing pigment and manganese siccative as described above, may be applied to the surface of the metal form and the coating then cured by baking at from 300° F. to 450° F. for a period of time sufficient to convert it to the insoluble, infusible state, the time generally varying from 1.5 hours at 300° F. to 0.05 hour at 450° F.

The rubber forms which are treated in accordance with my invention may be constructed of any of the usual metals employed for such service such as steel, iron, aluminum, etc. I have found that the coating of the present invention adheres unusually well to aluminum forms, especially if they have been pre-treated with a phosphatizing solution, as, for example, by the method known in the art as "bonderizing."

There are reported in the table below the results of experimental work comparing the mold release qualities and the surface appearance of rubber cured in contact with uncoated cold-rolled steel and with the same steel coated with a baked film of the resinous interpolymer described above, with and without a small amount of a polymethylphenylsiloxane type of silicone resin in accordance with my invention. For comparison, there are also included the results of tests made with common mold-lubricating additives in place of the methyl phenyl silicone resin, namely, polyethylene oxide, sodium stearate, and glycerine. The adhesion of the cured rubber to the mold surface, expressed as pounds pull required to separate a specimen 2½ inches wide from the mold is a measure of mold release qualities. In each case, the rubber mix was vulcanized in contact with the mold at 306° F. for 10 minutes.

The basic formulation used in the tests was as follows:

| | Parts by weight |
|---|---|
| Soluble, fusible resin made by interpolymerizing equimolar proportions of styrene and diallylic fumarate with 460% by weight of allyl alcohol based on the fumarate | 100 |
| Xylene | 100 |
| Raw sienna | 80.0 |
| Manganese naphthenate (6% manganese) | 4.2 |

The solids were dispersed in a solution of 30 parts of the interpolymer in 30 parts of the xylene on a 3-roll paint mill, whereupon the resulting dispersion was added to a solution of the balance of the interpolymer in the balance of the xylene. Coatings of this formulation, with or without the additives indicated in the following table, were applied to cold-rolled steel molds and baked at 400° F. for 20 minutes. The results of the mold release tests were as follows.

In the case of the uncoated cold-rolled steel mold, the adhesion was 0.49 pound and the molded rubber exhibited pronounced blooming and had a dull surface.

*Effect of various additives with resinous interpolymer of styrene, diallyl fumarate and allyl alcohol for coating cold-rolled steel molds used in vulcanizing rubber*

| Additive | Amount Added Based on Interpolymer | Adhesion | Appearance of Molded Rubber Surface |
|---|---|---|---|
| | Per cent | Pounds | |
| None | | 0.39 | Surface bloomed. |
| Polyethylene Oxide [1] | 1 | 0.25 | Do. |
| Do.[1] | 5 | 0.26 | Do. |
| Sodium Stearate | 1 | 0.26 | Do. |
| Glycerine | 1 | 0.29 | Do. |
| Polymethylphenylsiloxane.[2] | 1 | 0 | Excellent Surface. |

[1] Hard waxy solid. Sp. Gr. 1.2. Freezing range 50–55° C. Flash point above 475° F. Saybolt viscosity 500–700 sec. at 210° F. Soluble in water and in aromatic hydrocarbons.
[2] A 60% solution of polymethylphenylsiloxane in toluene, having a viscosity of 0.3 to 1.0 poise at 25° C. and a specific gravity of 1.06 at 25° C., was diluted to 15% polymethylphenylsiloxane with toluene; 6.3 parts of this 15% solution were added to basic formulation described above.

A test made in the same manner as just described but coating the mold with the straight polymethylphenylsiloxane resin gave zero adhesion, but comparative accelerated life tests performed on the interpolymer-polymethylphenylsiloxane coating and the straight polymethylphenylsiloxane coating by immersing cured sample coatings thereof in toluene for 24 hours showed that the straight polymethylphenylsiloxane coating had a very poor life. Thus, immersing the above-described coating made from the interpolymer and 1% of the polymethylphenylsiloxane in toluene for 24 hours followed by curing of rubber in contact with the coated surface showed that no change in adhesion value had been caused by such immersion in toluene. In contrast to this, the straight polymethylphenylsiloxane film lifted from the steel surface on such immersion in toluene. This result is entirely unexpected and indicates that long adhesion-preventing life can be obtained with interpolymer-alkyl aryl silicone resin coatings of the present invention, perhaps because of low solubility of the resulting film in the rubber stock in addition to the superior hardness, mar- and abrasion-resistance of the baked coating of my invention.

In order to further demonstrate the advantages of the present invention, a mold made of the same cold-rolled steel used in the foregoing tests was coated with a phenol-formaldehyde resin and baked for 40 minutes at 400° F. to yield a hard, infusible, insoluble film. The resulting mold was used to vulcanize rubber stock in the same manner as reported in the foregoing tests. The adhesion was 2.20 pounds and the molded surface exhibited pronounced blooming.

In the drawing, metallic mold halves 1 and 2 are shown as being provided with a film 3 of the coating of the present invention.

The following advantages are obtained by the practice of the present invention:

(1) Elimination of the painting of tires by virtue of the patent leather finish imparted by the new coating.

(2) Minimizing of rejects due to trapped air defects. This in turn enables the side wall vents to be eliminated and results in economies through elimination of the trimming of vent flash and rejects resulting from the trimming operation.

(3) Improvement of parting qualities which eliminates:

(a) *Lubricants.*—This results in eliminating rejects due to poor consolidation as a result of use of excess lubricants.

(b) *Talc.*—This results in minimized rejects and more efficient housekeeping.

(c) *Rejects due to poor parting qualities.*—Some special constructions such as certain types of automobile tires have a high percentage of rejects caused by a combination of the special mold construction and poor parting qualities of tire and mold. The present invention greatly reduces rejects from these causes.

(4) Minimizing of dirt collection on forms which is due mainly to rubber particles adhering to the forming surface. This minimizes rejects due to dirty forms and also enables costs of cleaning forms to be greatly reduced.

The baked resinous coating applied to the rubber-forming surface in accordance with my invention is very long-lived and withstands the severe conditions and relatively high temperature of rubber vulcanization, which commonly is carried out at from 250° F. to 325° F., for a great number of cycles. During usage the coating retains its hard, smooth finish so that the rubber articles cured in contact with the form are highly polished and of excellent appearance, being free from surface blooming.

The soluble, fusible interpolymers of a diallyl fumarate and a styrene prepared with diisobutylene, or cyclohexene, or other olefinic hydrocarbon as comonomer, are the subject matter of my copending application, Serial No. 734,555, filed March 13, 1947. The method of accelerating the cure of diallyl fumarate-styrene interpolymers with manganese salts is described and claimed in the same application.

Having thus described my invention, what I claim and desire to protect by Letters Patent is:

1. A metallic form for rubber, said form having its rubber-contacting metallic surface coated with a mixture of an initially acetone-soluble resinous interpolymer selected from the group consisting of acetone-soluble interpolymers of monomers consisting essentially of a styrene having the formula

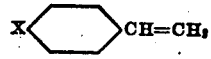

where X is selected from the class consisting of hydrogen, methyl and chlorine and a diallylic fumarate having the formula

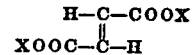

where X is selected from the class consisting of allyl and methallyl in relative proportions such that the molar ratio of said diallylic fumarate to said styrene ranges from 1:1 to 1:6 and acetone-soluble interpolymers of monomers consisting essentially of a styrene as previously defined and a diallylic fumarate as previously defined in the relative proportions previously set forth and from 10% to 700% by weight based on the weight of said diallylic fumarate of a third interpolymerizable monomer selected from the group consisting of allylic alcohols having the formula

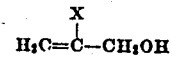

where X is selected from the group consisting of hydrogen and methyl and acyclic and alicyclic monoolefinic hydrocarbons and a minor proportion of a polymeric alkyl aryl silicone resin, said resinous interpolymer being converted to the insoluble, infusible state.

2. A metallic form for rubber, said form having its rubber-contacting surface coated with a mixture of an initially acetone-soluble resinous interpolymer selected from the group consisting of acetone-soluble interpolymers of monomers consisting essentially of a styrene having the formula

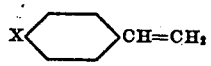

where X is selected from the class consisting of hydrogen, methyl and chlorine and a dialylic fumarate having the formula

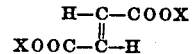

where X is selected from the class consisting of allyl and methallyl in relative proportions such that the molar ratio of said diallylic fumarate to said styrene ranges from 1:1 to 1:6 and acetone-soluble interpolymers of monomers consisting essentially of a styrene as previously defined and a diallylic fumarate as previously defined in the relative proportions previously set forth and from 10% to 700% by weight based on the weight of said diallylic fumarate of a third interpolymerizable monomer selected from the group consisting of allylic alcohols having the formula

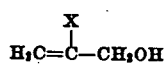

where X is selected from the group consisting of hydrogen and methyl and acyclic and alicyclic monoolefinic hydrocarbons, and a minor proportion of a polymeric methyl phenyl silicone resin, said resinous interpolymer being converted to the insoluble, infusible state.

3. A metallic form for rubber, said form having its rubber-contacting surface coated with a mixture of an initially acetone-soluble resinous interpolymer selected from the group consisting of acetone-soluble interpolymers of monomers consisting essentially of a styrene having the formula

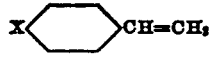

where X is selected from the class consisting of hydrogen, methyl and chlorine and a diallylic fumarate having the formula

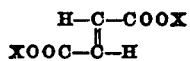

where X is selected from the class consisting of allyl and methallyl in relative proportions such that the molar ratio of said diallylic fumarate to said styrene ranges from 1:1 to 1:6 and acetone-soluble interpolymers of monomers consisting essentially of a styrene as previously defined and a diallylic fumarate as previously defined in the relative proportions previously set forth and from 10% to 700% by weight based on the weight of said diallylic fumarate of a third interpolymerizable monomer selected from the group consisting of allylic alcohols having the formula

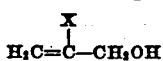

where X is selected from the group consisting of hydrogen and methyl and acyclic and alicyclic monoolefinic hydrocarbons, and a minor proportion of a polymeric alkyl aryl silicone resin, said resinous interpolymer being in the insoluble, infusible state, the proportion of said polymeric alkyl aryl silicone resin ranging from 0.2 to 1% by weight of said resinous interpolymer.

4. A metallic form for rubber, said form having its rubber-contacting surface coated with a mixture of an initially acetone-soluble resinous interpolymer prepared by interpolymerization of monomeric components consisting of styrene, diallyl fumarate and allyl alcohol wherein the molar ratio of diallyl fumarate to styrene ranges from 1:1 to 1:6 and wherein the proportion of allyl alcohol ranges from 10 to 700% by weight of said diallyl fumarate, and a minor proportion of a polymeric methyl phenyl silicone resin, said resinous interpolymer being in the insoluble, infusible state.

5. A metallic form for rubber, said form having its rubber-contacting surface coated with a mixture of an initially acetone-soluble resinous interpolymer prepared by interpolymerization of monomeric components consisting of styrene, diallyl fumarate and allyl alcohol wherein the molar ratio of diallyl fumarate to styrene ranges from 1:1 to 1:1.5 and wherein the proportion of allyl alcohol ranges from 300 to 500% by weight of said diallyl fumarate, and a minor proportion of a polymeric methyl phenyl silicone resin, said resinous interpolymer being in the insoluble, infusible state.

6. The method which comprises vulcanizing rubber in contact with a metallic form having its rubber-contacting surface coated with a compatible mixture of a resinous, initially acetone-soluble interpolymer selected from the group consisting of acetone-soluble interpolymers of monomers consisting essentially of a styrene having the formula

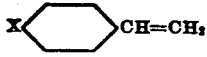

where X is selected from the class consisting of hydrogen, methyl and chlorine and a diallylic fumarate having the formula

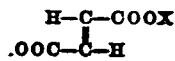

where X is selected from the class consisting of allyl and methallyl in relative proportions such that the molar ratio of said diallylic fumarate to said styrene ranges from 1:1 to 1:6 and acetone-soluble interpolymers of monomers consisting essentially of a styrene as previously defined and a diallylic fumarate as previously defined in the relative proportions previously set forth and from 10% to 700% by weight based on the weight of said diallylic fumarate of a third interpolymerizable monomer selected from the group consisting of allylic alcohols having the formula

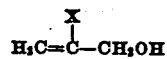

where X is selected from the group consisting of hydrogen and methyl and acyclic and alicyclic monoolefinic hydrocarbons, and a minor proportion of a polymeric alkyl aryl silicone resin, said resinous interpolymer being converted to the insoluble, infusible state prior to contact with rubber.

7. The method which comprises vulcanizing rubber in contact with a metallic form having its rubber-contacting surface coated with a compatible mixture of an initially acetone-soluble resinous interpolymer selected from the group consisting of acetone-soluble interpolymers of monomers consisting essentially of a styrene having the formula

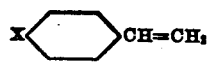

where X is selected from the class consisting of hydrogen, methyl and chlorine and a diallylic fumarate having the formula

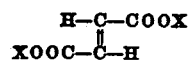

where X is selected from the class consisting of allyl and methallyl in relative proportions such that the molar ratio of said diallylic fumarate to said styrene ranges from 1:1 to 1:6 and acetone-soluble interpolymers of monomers consisting essentially of a styrene as previously defined and a diallylic fumarate as previously defined in the relative proportions previously set forth and from 10% to 700% by weight based on the weight of said diallylic fumarate of a third interpolymerizable monomer selected from the group consisting of allylic alcohols having the formula

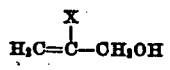

where X is selected from the group consisting of hydrogen and methyl and acyclic and alicyclic monoolefinic hydrocarbons, and from 0.2 to 1% by weight based on the weight of said interpolymer of a polymeric methyl phenyl silicone resin, said resinous interpolymer being converted to the insoluble, infusible state prior to contact with rubber.

8. The method which comprises vulcanizing rubber in contact with a metallic form having its rubber-contacting surface coated with a compatible mixture of an initially acetone-soluble resinous interpolymer prepared by interpolymerization of monomeric components consisting of styrene, diallyl fumarate and allyl alcohol wherein the molar ratio of diallyl fumarate to styrene ranges from 1:1 to 1:6 and wherein the proportion of allyl alcohol ranges from 10 to 700% by weight of said diallyl fumarate and a minor proportion of a polymeric methyl phenyl silicone resin, said resinous interpolymer being converted to the insoluble, infusible state prior to contact with rubber.

9. The method which comprises vulcanizing rubber in contact with a metallic form having its rubber-contacting surface coated with a compatible mixture of an initially acetone-soluble resinous interpolymer prepared by interpolymerization of monomeric components consisting of styrene, diallyl fumarate and allyl alcohol wherein the molar ratio of diallyl fumarate to styrene ranges from 1:1 to 1:1.5 and wherein the proportion of allyl alcohol ranges from 300 to 500% by weight of said diallyl fumarate and from 0.2 to 1% by weight based on said interpolymer of a polymeric methyl phenyl silicone resin, said resinous interpolymer being converted to the insoluble, infusible state prior to contact with rubber.

10. A coating composition comprising an acetone-soluble, fusible, resinous interpolymer selected from the group consisting of acetone-soluble interpolymers of monomers consisting essentially of a styrene having the formula

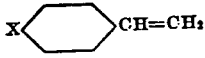

where X is selected from the class consisting of hydrogen, methyl and chlorine and a diallylic fumarate having the formula $$H-C-COOX$$
$$XOOC-C-H$$

where X is selected from the class consisting of allyl and methallyl in relative proportions such that the molar ratio of said diallylic fumarate to said styrene ranges from 1:1 to 1:6 and acetone-soluble interpolymers of monomers consisting essentially of a styrene as previously defined and a diallylic fumarate as previously defined in the relative proportions previously set forth and from 10% to 700% by weight based on the weight of said diallylic fumarate of a third interpolymerizable monomer selected from the group consisting of allylic alcohols having the formula

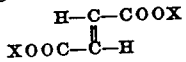

where X is selected from the group consisting of hydrogen and methyl and acyclic and alicyclic monoolefinic hydrocarbons and a minor proportion of a polymeric alkyl aryl silicone resin, said interpolymer and said silicone resin being dissolved in a volatile organic solvent.

11. The method of preparing a metallic form for use in vulcanizing rubber which comprises coating the rubber-contacting metallic surface of the metallic form with a coating composition comprising an acetone-soluble, fusible resinous interpolymer selected from the group consisting of acetone-soluble interpolymers of monomers consisting essentially of a styrene having the formula

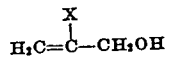

where X is selected from the class consisting of hydrogen, methyl and chlorine and a diallylic fumarate having the formula

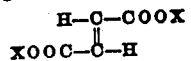

where X is selected from the class consisting of allyl and methallyl in relative proportions such that the molar ratio of said diallylic fumarate to said styrene ranges from 1:1 to 1:6 and acetone-soluble interpolymers of monomers consisting essentially of a styrene as previously defined and a diallylic fumarate as previously defined in the relative proportions previously set forth and from 10% to 700% by weight based on the weight of said diallylic fumarate of a third interpolymerizable monomer selected from the group consisting of allylic alcohols having the formula

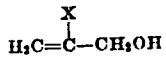

where X is selected from the group consisting of hydrogen and methyl and acyclic and alicyclic monoolefinic hydrocarbons and a minor proportion of a polymeric alkyl aryl silicone resin dissolved in a volatile organic solvent, allowing the bulk of the organic solvent to evaporate, and baking the resulting coating to an insoluble, infusible state, the coating so obtained preventing adhesion of rubber to the metallic surface during vulcanization and imparting a smooth finish to the vulcanized rubber article.

12. The method of preparing a metallic form for use in vulcanizing rubber which comprises coating the rubber-contacting metallic surface of the metallic form with a coating composition comprising an acetone-soluble, fusible resinous interpolymer of styrene, diallyl fumarate and allyl alcohol wherein the molar ratio of diallyl fumarate to styrene ranges from 1:1 to 1:6 and wherein the proportion of allyl alcohol ranges from 10 to 700% by weight of said diallyl fumarate, and from 0.2 to 1% by weight based on said interpolymer of a polymeric methyl phenyl silicone resin dissolved in a volatile organic solvent, allowing the bulk of the organic solvent to evaporate, and baking the resulting coating to an insoluble, infusible state, the coating so obtained preventing adhesion of rubber to the metallic surface during vulcanization and imparting a smooth finish to the vulcanized rubber articles.

FRANK J. CARLIN.

REFERENCES CITED

The following references are of record in the file of this patent:

UNITED STATES PATENTS

| Number | Name | Date |
|---|---|---|
| 2,258,222 | Rochow | Oct. 7, 1941 |
| 2,348,677 | Freeman | May 9, 1944 |
| 2,388,153 | Jones | Oct. 30, 1945 |
| 2,441,548 | Sperry | May 11, 1948 |

OTHER REFERENCES

Plastics Technology, Plastics Mold Release.